3,341,496
TWO-STEP PROCESS FOR THE POLYMERIZATION OF ALDEHYDES
Tatsuya Imoto, Osaka, Kiyoshi Aotani, Habikino-shi, Osaka, and Tsutomu Matsubara, Kishiwada-shi, Osaka, Japan, assignors to Chisso Corporation, a corporation of Japan
No Drawing. Filed Sept. 18, 1963, Ser. No. 309,843
Claims priority, application Japan, Sept. 22, 1962, 37/41,611; July 3, 1963, 38/38,183
5 Claims. (Cl. 260—67)

This invention relates to a process for polymerizing aldehydes and more particularly to a process for producing aldehyde polymers by the use of a polymerization catalyst or catalyst selected from the group consisting of alkali metal-amalgams and alkaline earth metal-amalgams, in the presence or absence of an inert solvent, which comprises polymerizing an aldehyde at a lower temperature and subsequently completing the polymerization reaction at a higher temperature.

Polymerization of aldehydes, especially acetaldehyde or formaldehyde, has been studied to obtaine useful polymers. Most of these processes are ionic polymerizations using ionic initiators. In general, ionic polymerization is carried out at a temperature of below 0° C. and in extreme cases at −80° C. It is well known that reaction rate depends on reaction temperature. Therefore, the reaction rate correspondingly decreases markedly as the temperature decreases. Moreover, from a general kinetic point of view, high molecular weight polymers can not be obtained under the condition of low polymerization rate. Hence, in order to obtain a high molecular weight polymer under the condition as described above, the polymerization temperature should be kept as high as possible, It has previously been reported by T. Imoto and T. Matsubara, Journal of Polymer Science, volume 56, page S4–S7 (1962), that a new process for producing an aldehyde polymer is effected by polymerizing an aldehyde by the use of an alkali metal-amalgam catalyst, in which a polymer having presumably the polyvinyl alcohol type structure is obtained.

The reaction formula may be shown as follows:

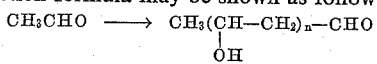

The resulting polymer is different from conventional polyether type polyacetadehyde having long chains of carbon atoms alternating with oxygen atoms as shown in the following reaction formula:

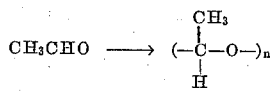

In the case of a polyether type polyaldehyde having high molecular weight (e.g. hundreds of thousands of molecular weight), the polymerization rate is very fast even at low temperatures, whereas in the case of polyvinyl alcohol type polymers, the reaction rate is slow. For example, using the reaction conditions of a temperature of 0°–35° C. for 20 hrs. only a low molecular weight polymer is formed, e.g., the molecular weight is of the order of several hundreds or at the highest of the order of one thousand and several hundreds. In accordance with the foregoing basic theory it is desirable to carry out the polymerization reaction at a higher temperature to increase the reaction rate. On the other hand, the higher that the reaction temperature is, the greater is the tendency for a dehydrating side reaction to occur, by which an unsaturated polymer as shown in the following formula is formed:

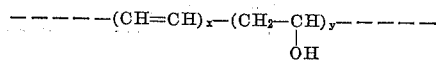

The double bond formed colors the polymer. The maximum allowable reaction temperature for suppressing the dehydration depends on the kind of catalyst used, its concentration and reaction pressure etc., preferably the upper limit being approximately from 10° C. to 20° C.

Since the reaction temperature can not be over 10°–20° C., it is impossible to obtain a high molecular weight polymer by means of an elevated temperature. In order to overcome such a discrepancy as mentioned above, we have been working several years and have now found that a two-step polymerization solves this problem. Namely, in the first step, the polmerization is carried out at a temperature below 20° C. by use of a catalyst selected from the group consisting of alkali metal amalgams and alkaline earth metal amalgams in the presence or absence of an inert solvent, thereby to yield the intermediate polymer having a molecular weight of the order of from several hundreds to one thousand and several hundreds, and the second step polymerization is performed immediately after the first step at a temperature of from 70° C. to 80° C. As the second step polymerization reaction is completed almost instantaneously at such a temperature, it is possible to shift quickly into the concentration period which is performed at a temperature of from 70° C. to 80° C. and a reduced pressure of 10–15 mm. Hg. Thus the present invention makes it possible to save reaction time, because the second-step polymerization takes place in a transient step from the first step to the concentration period. The polymers thus obtained have higher molecular weights than the polymers obtained by one-step polymerization.

Although the second-step polymerization is seemingly different from the first-step polymerization, both polymerizations proceed with the same reaction mechanism. It is obvious from the fact that elementary analysis, infrared absorption spectra analysis, external appearance and viscosity of the polymers obtained through two-step polymerization show the same properties as those obtained in the first-step polymerization. In the second-step, the polymer produced in the first-step polymerization further continues to increase its molecular weight without accompanying dehydration even at a higher temperature.

Although this invention may be carried out in the presence or absence of an inert solvent, it will be preferable to carry out the reaction in the presence of a solvent. Since the polymerizations using amalgam catalyst are of a heterogeneous reaction in which polymerization takes place on the surface of the amalgam, it is necessary to enhance the contact of reaction mixture with catalyst during the period of reaction time, e.g., by means of agitation or by other methods. Furthermore, if the reaction were carried out without agitation, the catalyst surface would be locally overheated by the heat evolved from the exothermic polymerization reaction to above a temperature of maximum allowable value which is necessary for preventing double bond formation. When a large excess of alkali metal or alkaline earth metal compared with aldehyde is present in the reaction system, the reaction temperature also rises and is liable to exceed the maximum allowable temperature for suppressing double bond formation. In order to overcome this undesirable influence, it is necessary to agitate the reaction mixture effectively and to keep the relative concentration of the catalyst versus aldehyde low. For this purpose, the reaction mixture is diluted with a suitable solvent. However, when the reaction is carried out in the presence of a solvent, the yield and molecular weight of the resulting polymer have a certain relation to the monomer concentration in the solution. For example, an experiment was performed to check the effect of acetaldehyde monomer concentration in the first-step by use of toluene as solvent. The results are shown in Table I. From these data it is clear that the preferable result with respect to yield and molecular weight is obtained when the concentration of the monomer is in the range of from 50 to 60%. Similar tendencies are observed also in the case of other inert solvents. Therefore, in the case of solution reactions it is necessary to maintain the monomer concentration in the solutions at suitable values in order to obtain high molecular weight polymers with good yield.

resulting mixture was subjected to thermal decomposition to produce acetaldehyde. The acetaldehyde thus obtained was repeatedly purified by distillation under a nitrogenous atmosphere. The purified acetaldehyde was placed in a reactor previously flushed with dry nitrogen gas and then cooled at a temperature of from −45° to −50° C. (dipped in an acetone-Dry Ice or methanol-Dry Ice bath). A given amount of catalyst was charged thereto and, while TABLE I.—INFLUENCE OF MONOMER CONCENTRATION IN THE SOLVENT AT THE FIRST-STEP POLYMERIZATION OF ACETALDEHYDE USING Li–Hg

[alkali metal concentration in amalgam 5.5%]

| Monomer concentration in toluene (percent) | Acetaldehyde monomer (g.) | Toluene (g.) | Catalyst (g.) | Polymerization temperature (° C.) | Polymerization time (hrs.) | Yield | Molecular weight of polymer |
|---|---|---|---|---|---|---|---|
| 31 | 118 | 262 | 1.2 | 0 | 20 | 18 | 970 |
| 42 | 158 | 218 | 1.6 | do | do | 10 | 1,080 |
| 53 | 193 | 174 | 2.0 | do | do | 28 | 1,350 |
| 58 | 213 | 157 | 2.2 | do | do | 26 | 1,320 |
| 73 | 237 | 87 | 2.4 | do | do | 19 | 1,060 |
| 87 | 292 | 44 | 3.0 | do | do | 10 | 820 |
|  | 556 |  | 5.0 | 0–7 | 40 | 18 | 450 |

The solvents which may be used in the present invention are those miscible with aldehydes and which are inert to reactions therewith. Suitable solvents are, for example, n-hexane, petroleum ether, ethers, toluene, chloroform, dichloromethane, chlorobenzene, tetrahydrofuran, and carbon tetrachloride. As is clear from Table III (Examples 4–6), it is possible to increase the yield and molecular weight of the polymer further by carrying out the polymerization in the presence of a solvent and in two steps. Aldehydes polymerizable in the present invention are acetaldehyde, acetaldol, crotonaldehyde, propionaldehyde and the like, or mixtures of the same. Whatever process of polymerization is employed, it is necessary to keep the purity of the aldehyde and the solvent as high as possible.

Catalysts suitable for use in carrying out the present invention are alkali metal-amalgams, such as sodium-, potassium-, lithium-amalgam and the like, alkaline earth metal-amalgams, such as calcium-, strontium-, barium-, magnesium-amalgam and the like, or mixtures of any of these.

agitating, the reaction was carried out at an indicated temperature for an indicated period of time. When the first step reaction was completed, the contents were subjected to the second step reaction, under refluxing and raising the temperature gradually up to about 80° C., and subsequently applying reduced pressure of about 10–12 mm. Hg and a temperature of 75°–78° C. Then the residual catalyst was separated by filtration and the filtrate was dissolved in two times its own weight of distilled water.

This solution was treated by means of an ion exchange resin to remove existing alkali and then concentrated in vacuo on a water-bath. The reaction conditions and the yield and molecular weight of the produced polymers are shown in Table II, in comparison with those of polymers obtained by the one-step polymerization.

Note: In the case of the one step polymerization process, treatments after ploymerization were as follows: separation of residual catalyst, elimination of alkaline substances at a temperature lower than 20° C., and concentration.

TABLE II.—TWO-STEP POLYMERIZATION OF ACETALDEHYDE IN COMPARISON WITH ONE-STEP POLYMERIZATION

| Example No. | Acetaldehyde monomer (g.) | Amalgam (g.) | Alkali metal concn. in amalgam (percent) | Polymerization temperature (° C.) | Polymerization time (hrs.) | Yield | Molecul weight of polymer |
|---|---|---|---|---|---|---|---|
| 1 | 575 | Na-Hg, 8.5 | 2.5 | −5 | 52 | 30 | 2,000 |
| Ref. 1* | 575 | Na-Hg, 8.5 | 2.5 | −5 | 52 | 21 | 600 |
| 2 | 471 | Na-Hg, 7.0 | 2.5 | 0–7 | 20 | 24 | 800 |
| Ref. 2* | 471 | Na-Hg, 7.0 | 2.5 | 0–7 | 20 | 19 | 630 |
| 3 | 556 | Li-Hg, 5.0 | 5.5 | 0–7 | 40 | 20 | 1,030 |
| Ref. 3* | 556 | Li-Hg, 5.0 | 5.5 | 0–7 | 40 | 18 | 450 |

* One-step polymerization.

The polymers thus obtained have widespread uses in the fields where polyols have been used as raw materials, such as polyurethane resins, alkyd resins, ester type plasticizers, explosives, surface active agents, etc.

In order to show practical embodiments of the present invention, the following examples are illustrated in comparison with one-step polymerization processes.

*Examples 1–3*

Commercially pure paraaldehyde was dehydrated with anhydrous sodium sulfate. A small amount of concentrated sulfuric acid was added to the dehydrated paraaldehyde under a dry nitrogeneous atmosphere, and then the In view of the above facts it is quite a reasonable conclusion that the yield and molecular weight of the polymers obtained by these processes are greater than those (Refs. 1–3) obtained from one-step polymerization.

*Examples 4–6*

A given amount of purified n-hexane was charged into an agitator-fitted reactor which had been placed on an acetone-Dry Ice bath to cool at the temperature of −45°–50° C. To the said reactor a decided amount of catalyst was added and the reaction mass was kept at an indicated temperature under agitation. Acetaldehyde purified as described in Examples 1–3 was dropped into the reactor and the first step reaction was carried out at the indicated temperature and time. Then the contents were heated on a water-bath, raising the temperature up to 75°–80° C., and maintained in this temperature range for about 10 minutes under refluxing for the second step reaction. After the reaction was over, the contents were immediately concentrated under reduced pressure (10–12 mm. Hg) and at a temperature of 75°–78° C. The residual product was purified as described in Examples 1–3. The reaction conditions and the yield and molecular weight of the resulting polymers are given in Table III in comparison with those of polymers obtained by one-step polymerization.

TABLE III.—TWO-STEP POLYMERIZATION OF ACETALDEHYDE IN COMPARISON WITH ONE-STEP POLYMERIZATION USING n-HEXANE AS SOLVENT

| Ex. No. | Acetaldehyde monomer (g.) | n-Hexane (g.) | Amalgam (g.) | Alkali-metal concn. in amalgam (percent) | Polymerization temperature (° C.) | Polymerization time (hrs.) | Yield (percent) | Molecular weight of polymer |
|---|---|---|---|---|---|---|---|---|
| 4 | 193 | 66 | Li-Hg 2 | 5.5 | 0 | 20 | 40 | 1,580 |
| Ref. 4* | 193 | 66 | Li-Hg 2 | 5.5 | 0 | 20 | 35 | 1,030 |
| 5 | 193 | 132 | Li Hg 2 | 5.5 | 0 | 20 | 81 | 1,920 |
| Ref. 5* | 193 | 132 | Li-Hg 2 | 5.5 | 0 | 20 | 54 | 1,140 |
| 6 | 193 | 170 | Li-Hg 2 | 5.5 | 0 | 20 | 53 | 1,100 |
| Ref. 6* | 193 | 170 | Li-Hg 2 | 5.5 | 0 | 20 | 40 | 920 |

*One-step polymerization.

Judging from these data, it seemed reasonable to assume that the yield and molecular weight of the polymers obtained by these processes (solution polymerization) are greater than those (Refs. 4–6) obtained from one-step polymerization and the results (Refs. 1–3) obtained by bulk polymerization.

*Examples 7–8*

Polymerization of acetaldehyde was carried out in the same manner as described in Examples 4–6 except that purified dry toluene was used as the solvent instead of n-hexane. The results obtained appear in Table IV in comparison with one-step polymerization.

TABLE IV.—TWO-STEP POLYMERIZATION OF ACETALDEHYDE IN COMPARISON WITH ONE-STEP POLYMERIZATION USING TOLUENE AS SOLVENT

| Ex. No. | Acetaldehyde monomer (g.) | Toluene (g.) | Amalgam (g.) | Alkali-metal concn. in amalgam (percent) | Polymerization temperature (° C.) | Polymerization time (hrs.) | Yield (percent) | Molecular weight of polymer |
|---|---|---|---|---|---|---|---|---|
| 7 | 237 | 87 | Li-Hg, 2.5 | 5.5 | 0 | 20 | 41.7 | 2,390 |
| Ref. 7* | 237 | 87 | Li-Hg, 2.5 | 5.5 | 0 | 20 | 16.7 | 1,360 |
| 8 | 197 | 174 | Li-Hg, 2.0 | 5.5 | 0 | 20 | 49.6 | 2,440 |
| Ref. 8* | 197 | 174 | Li-Hg, 2.0 | 5.5 | 0 | 20 | 26.0 | 1,3 |

*One-step polymerization.

It is clear that the two-step polymerization using toluene as solvent is also more effective than the one-step polymerization and that the molecular weight of the obtained polymers are higher than those of the polymers obtained using n-hexane, but the former are inferior to the latter in the amount of yield.

What is claimed is:

1. In a method for the production of an aliphatic aldehyde polymer by polymerizing the aldehyde in the presence of a metal amalgam catalyst, the improvement which comprises polymerizing an aldehyde selected from the group consisting of acetaldehyde, acetaldol, propionaldehyde, crotonaldehyde and mixtures thereof, in the presence of a catalytic amount of a metal amalgam polymerization catalyst selected from the group consisting of alkali metal-amalgams and alkaline earth metal-amalgams, in the presence of an inert solvent for the aldehyde in an amount of 0 to about 70% by weight based on the total feed, and in the following two steps: the first step which comprises polymerizing the aldehyde at a temperature of from about −40° C. to 20° C., at a pressure of from normal pressure to pressure above normal pressure for less than about 50 hours, and the second step which comprises further polymerizing the resultant polymer having a molecular weight of from several hundreds to one thousand and several hundreds by raising the temperature of the reaction mixture obtained in the first step to a temperature of from 70° to 80° C., to form a polymer having a molecular weight higher than that of the polymer obtained in the first step.

2. A process according to claim 1, wherein said aldehyde is acetaldehyde.

3. A process according to claim 1, wherein said solvent is a compound miscible with said aldehyde and is selected from the group consisting of n-hexane, toluene, petroleum ether, ethers, tetrahydrofuran, chloroform, dichloromethane, carbon tetrachloride, chlorobenzene and mixtures thereof.

4. A process according to claim 1, wherein the concentration of said aldehyde in said solvent is from 50 to 60% by weight.

5. A process according to claim 1, wherein said metal-amalgam polymerization catalyst is selected from the group consisting of sodium-amalgam, potassium-amalgam, lithium-amalgam, calcium-amalgam, barium-amalgam, stronium-amalgam, magnesium-amalgam and mixtures thereof.

References Cited

UNITED STATES PATENTS 3,005,799  10/1961  Wagner _____ 260—67

OTHER REFERENCES

Imoto et al.: Journal of Polymer Science, vol. 56, pp. S4–S7, 1962.

Sobue et al.: Journal of Polymer Science, part C., Polymer Symposia, No. 4, pp. 147–155 (International Symposium on Macromolecular Chemistry, Paris, July 1963, part I).

Russian Chemical Reviews, vol. 31, No. 4, pp. 225–235 (1962).

WILLIAM H. SHORT, *Primary Examiner.*

L. M. PHYNES, *Assistant Examiner.*